July 15, 1969  S. PRELOWSKI  3,455,117
METHOD AND APPARATUS FOR COOLING AND SUBCOOLING
FLUIDS SUCH AS HYDROGEN
Filed Oct. 3, 1966  2 Sheets-Sheet 1

INVENTOR
Stefan Prelowski

BY *Sheridan and Ross*
ATTORNEYS

INVENTOR
Stefan Prelowski

United States Patent Office 3,455,117
Patented July 15, 1969

3,455,117
METHOD AND APPARATUS FOR COOLING AND SUBCOOLING FLUIDS SUCH AS HYDROGEN
Stefan Prelowski, Littleton, Colo., assignor to Martin-Marietta Corporation, New York, N.Y., a corporation of Maryland
Filed Oct. 3, 1966, Ser. No. 583,551
Int. Cl. F25j 1/02, 5/00
U.S. Cl. 62—45    11 Claims

ABSTRACT OF THE DISCLOSURE

The apparatus for producing slush hydrogen includes a two stage sonic compressor which delivers gas phase hydrogen to the inlet end of a helical coil. The high momentum hydrogen gas is injected along with the liquid phase hydrogen into a helical coil by an adjustable nozzle. The gas moves through the coil at a very high velocity which along with the helical configuration of the coils maintains the liquid and gas phase gas hydrogen separated so that the hydrogen gas cools the hydrogen liquid as it moves through the coils. The cool hydrogen liquid is then directed into a vortex slush generator which continuously produces slush hydrogen.

---

This invention relates to a method and apparatus for cooling and subcooling fluids and more particularly to an improved method and apparatus for the production of slush hydrogen.

Slush hydrogen is the term used to describe a mixture of liquid hydrogen and solid hydrogen. The mixture is usually about 50% of each phase, although varying ratios of liquid and solid phase may be present. Although this process may be applied to normal hydrogen, that is, hydrogen having about 25% para and 75% ortho content, it is much more practical to employ this process only with para hydrogen. This preference arises because normal hydrogen at low temperatures tends to spontaneously convert to the para form and in doing so evolves considerable amounts of heat, referred to as the heat of conversion. This heat is sufficient to cause either a significant amount of liquid hydrogen to change to a vapor phase or a corresponding amount of solid hydrogen to melt to the liquid form. Thus by starting this process with hydrogen which is substantially all in the para form no heat of conversion will be evolved to nullify the gains achieved by this process in making slush hydrogen. Generally, therefore, in order to simplify this specification, when hydrogen is referred to as being in a cold state, it may be interpreted as being para hydrogen.

Fuels for spacecraft must have certain characteristics which are compatible with requirements for space flight. These include a high energy content per pound. Consequently, hydrogen is a highly desirable spacecraft fuel because it has both a high heat of combustion and a high specific impulse. Hydrogen carried as a compressed gas, however, it not suitable for this purpose since the weight of the required tankage would nullify any advantages of the high heat of combustion of the hydrogen. Hence, it has been the practice to use hydrogen in its liquid form when it is used as a spacecraft fuel.

One of the limitations of the use of liquid hydrogen, however, arises from its low density (4.42 lbs. per cubic foot) which thus necessitates the requirement for large volume containers and thereby requires large volumes within the spacecraft where space is at a premium. Moreover, at a pressure of one atmosphere liquid hydrogen boils at a temperature of only 20.39° K. Consequently, to present the influx of heat to the hydrogen and to prevent its vaporization at this extremely low temperature it is necessary to store the liquid hydrogen in a container that is well insulated which, of course, adds to the spacecraft's weight. Ideally, therefore, from an energy standpoint alone, it would be preferable to use solid hydrogen because it has a greater density at its triple point (5.41 lbs. per cubic foot) as opposed to liquid hydrogen at its boiling point. Thus a given sized tank can contain about 20% more weight of solid hydrogen as compared to the liquid form. Thus not only is space conserved, but because of its smaller bulk less insulation is required, thereby reducing the spacecraft's weight requirements.

Another advantage arising from the use of solid hydrogen is the increased amount of refrigeration that is available in the stored product. This is particularly due to solid hydrogen's heat of fusion. This increased refrigeration is especially desirable for long duration missions where the utmost in storage duration capability is required. To date, however, in spite of these advantages it has not been practical to use solid hydrogen by itself because of the difficulty of handling it and pumping it through transfer lines.

In recent years, therefore, there has been considerable interest in the use of slush hydrogen which has satisfactory fluid handling properties and also possesses some of the higher density and storability features of the solid form of hydrogen. It is a primary object of this invention, therefore, to provide an improved method and apparatus for the preparation of slush hydrogen.

Prior art methods usually require the pumping of hydrogen vapor over a container of liquid hydrogen thus lowering its temperature to the triple point, so that, with continued pumping, the formation of solid hydrogen occurs. These methods are usually accompanied by some stirring means to ensure that the crystals of hydrogen will be maintained in a suspended condition and will not form either a solid cake on the bottom of the container or a crust either on the top of the fluid or on the container sides. These prior art methods usually require the pumping of large volumes of hydrogen gas due to hydrogen's low triple point pressure thus necessitating either large vacuum pumps capable of handling huge volumes of gas or several stages of smaller pumps where some of the gas is removed at a higher pressure.

Another prior art method involves the use of a freezing and thawing technique which has thermodynamic inefficiencies associated with the thawing process. Moreover, for the most part, both of these prior art methods are basically batch rather than continuous processes, and, therefore, are subject to all of the inherent inefficiencies and limitations of batch processes.

Consequently, it is an object of this invention to provide a method and apparatus for the continuous production of equilibrium para hydrogen slush.

It is a further object of this invention to provide a method for the generation of extremely fine particles of solid hydrogen which are maintained in suspension more easily.

It is a further object of this invention to provide a method and apparatus for the extremely rapid production of slush hydrogen.

In accordance with a principle of the invention high momentum cold hydrogen gas and liquid hydrogen are passed through a suitable two phase injector nozzle or the like into a helically coiled tube. As the two phases pass through the helical coil they separate and expand so that the liquid phase becomes sub-cooled. After passing through the helical coil the two phases are separated and the sub-cooled liquid hydrogen is injected into a Ranque-Hilsch type of tube so that the liquid hydrogen turns to a thin film of slush as it moves upwardly about the tube's wall in a helical path to exit through a discharge volute as para hydrogen slush.

Briefly, the method of the invention includes two distinct cooling steps in the production of para hydrogen slush. That is, the liquid is first sub-cooled in a two phase helically coiled tube and then, after separation from its carrier gas, is further cooled and turned into slush in a Ranque-Hilsch type of vortex slush generator. In other words, the first cooling stage employs a two phase coil tube while the second cooling step employs a cylindrical vortex generator. In this manner, the para hydrogen slush is produced continuously and more rapidly than has been possible with prior art methods. Moreover, the slush is comprised of small uniform crystals that have not been previously generally obtainable.

An additional advantage of the method and apparatus of the invention is that because the process is continuous and because the need for very large capacity vacuum pumps has been considerably reduced, both the apparatus and process are of a relatively low cost.

The foregoing and other objects, features, and advantages of this invention will be apparent from the following more particular description of a preferred embodiment thereof as illustrated in the accompanying drawings.

Figure 1:
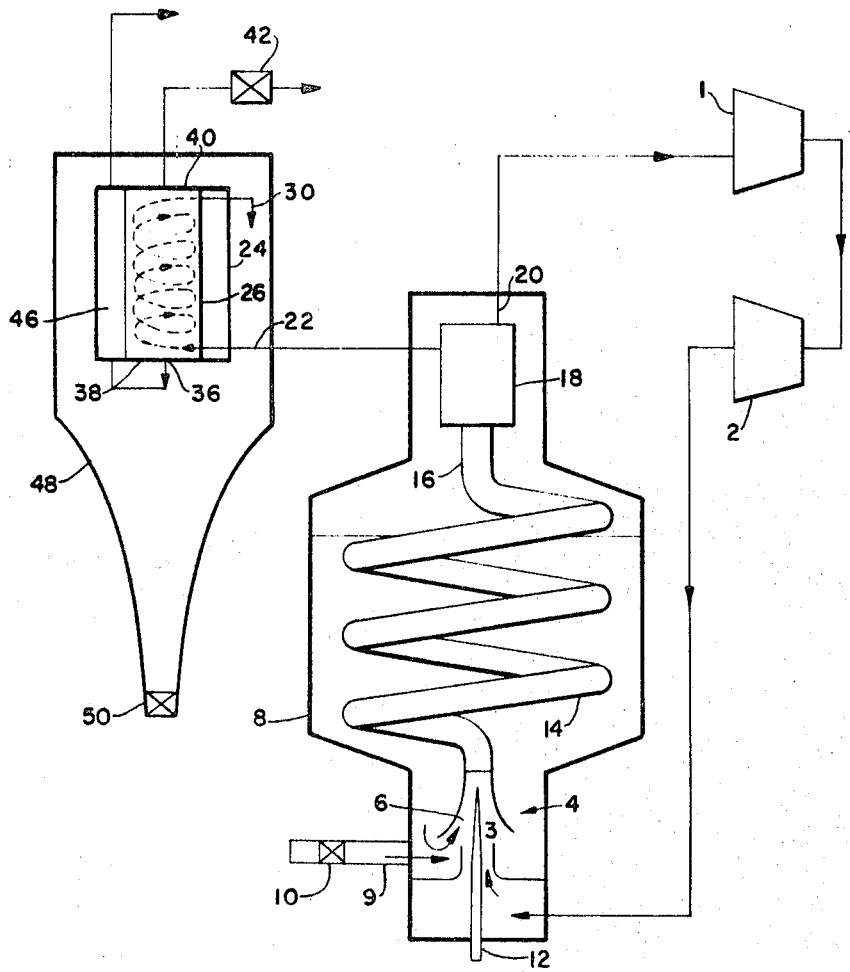
FIG. 1 is a flow diagram of the invention's apparatus and method of producing slush hydrogen.
Figure 3:
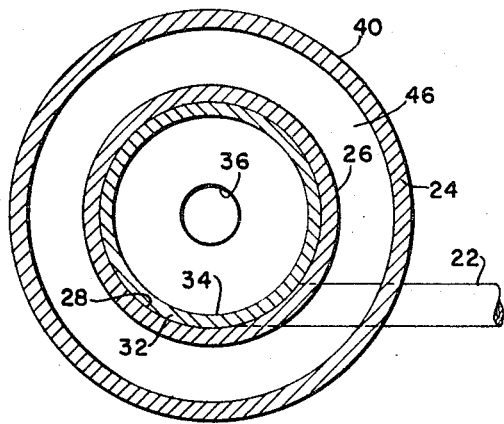
FIG. 3 is a sectional view of the vortex slush generator taken along the lines 3—3 in FIG. 2.

A preferred embodiment of the invention will now be described in connection with FIG. 1 wherein hydrogen gas is compressed in a compressor 1 and enters a turbo expander 2 at suitable inlet conditions (for example 3.5 atmospheres and 32.0° K.) such that the expanded outlet gas is at a temperature of about 21° K. and a pressure of about 1.3 atmospheres. This cold gaseous hydrogen from the expander 2 is combined at 3 in an injector 4 with a liquid hydrogen stream entering in line 6 from the tank 8 whose ullage is in turn reduced by liquid hydrogen fed through line 9 which is valved at 10. The liquid and gas stream is then forced, in a two-phase condition, past a needle valve 12 into a helical tube 14 in the tank 8 so that the two phases leave the injector 4 in a fully developed annular flow pattern.

The characteristics of the two-phase mixture leaving the injector 4 may be regulated by varying, among other things, one or more of the following parameters:

(a) The speed of the compressor 1;

(b) The pressure in the tank 8 which encloses the helical coil tube 14 and which can be controlled by any suitable means; and (c) The axial position of the needle valve 12 which restricts the flow of gaseous and liquid hydrogen into the nozzle of injector 4.

Because of the centrifugal force field arising from the injection of the two fluid phases into the helical tube 14, the annular pattern of flow rapidly changes to a separated pattern with the liquid phase being continually centrifuged to the outermost diameter of the helical coil 14. Within the coils of the helical tube an almost adiabatic expansion occurs. Hence, as the mixture of liquid and gas moves through the helical tube there is an increase in velocity of the gaseous phase because the gas phase continues to increase in volume. This volumetric increase is due both to the lowering of the pressure as the fluid moves through the tube and the actual increase of the mass of the gaseous phase as the liquid phase undergoes a transition into a gaseous state. This process continues throughout the helical tube 14 until the two-phase fluid emerges out of the helical tube at 16 into a phase separator 18. As the two-phase mixture enters the phase separator 18 it has a temperature of about 15° K. and a pressure of about 0.132 atmosphere (100 mm.). The phase separator 18 serves to separate the cold liquid phase from the cold gas phase. The pressure of the phase separator's outlet 20 is maintained at the value of about 0.132 atmosphere by means of any suitable regulator associated with the compressor 1 which recompresses the separated gaseous phase. In this respect, it should be noted, that although a single stage compressor has been illustrated, plural compressor stages are equally satisfactory and, in fact, preferred in some applications of the general principles set forth herein. Similarly, as will be understood by those skilled in the art, gas can be added to the system at any convenient point which may be either before or after the compressor as may be convenient in a given application.

Figure 2:
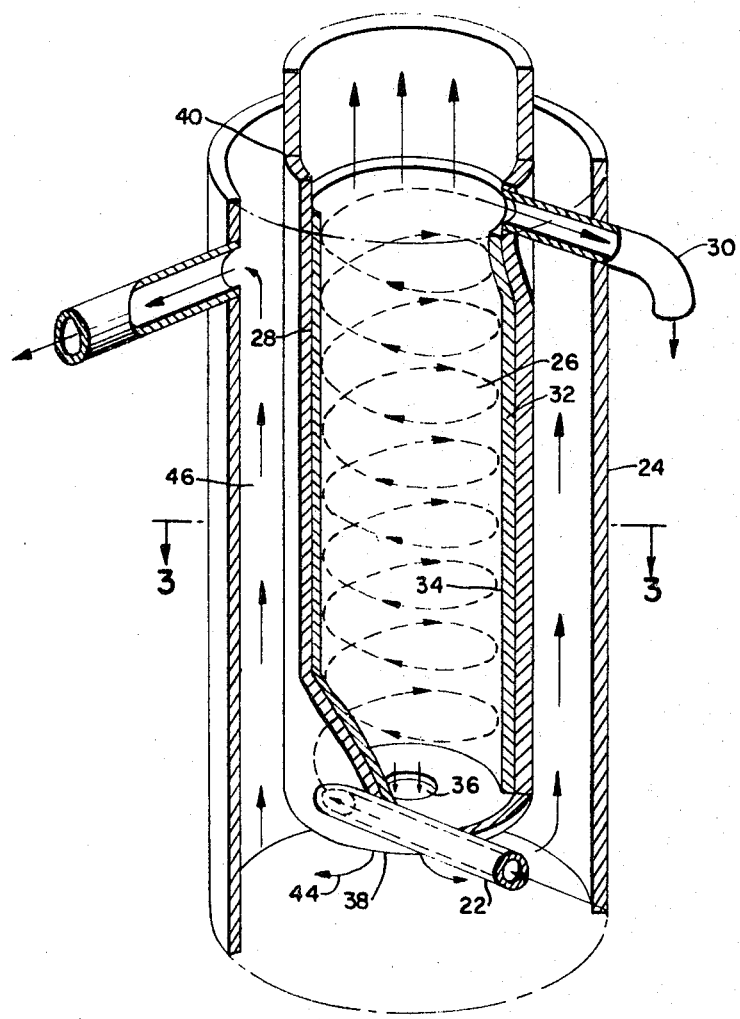
FIG. 2 is an isometric view in greater detail of the vortex slush generator which more clearly shows the features of its construction and operation.

The phase separator 18 diverts the 15° K. liquid hydrogen into the inlet volute 22 of a vortex slush generator 24 at a high kinetic energy. As shown in FIGS. 1 and 2 the liquid phase is injected tangentially into the vortex slush generator's inner cylindrical portion 26 which acts as a vortex tube, after which the liquid moves axially along the tube's inner wall 28 in a helical path towards a similarly tangentially oriented discharge volute 30.

It is in this vortex tube 26 that the formation of the fine crystals of solid hydrogen occurs to produce the hydrogen slush. This is accomplished by the Ranque-Hilsch effect in the following manner. The strong centrifugal field existing in the vortex tube 26 maintains a thin annular layer 32 of the spinning liquid close to the wall 28 of the vortex tube 26 while some of the liquid reverts to its gaseous state and moves about the inner portion of the chamber. This is because of the liquid's greater density. The centrifugal force field also creates a pressure gradient within the tube which decreases in a direction radially inwardly. The innermost cylindrical surface 34 of the liquid annulus 32 is thusly maintained at triple point conditions for para hydrogen. That is, 13.813° K. and 0.096 atmosphere.

As the liquid spins within the tube the vapor which is evolved moves radially inwardly. This vaporization provides the refrigeration for both the final cooling of the liquid phase and the removal of the heat of fusion of the thusly formed solid phase. As the vapor leaves the innermost cylindrical surface 34 it forms a gaseous core within the central portion of the tube 24. From this point on the gas behaves in the well known manner of a gas expanding within a Ranque-Hilsch tube. That is, the colder gas passes through a central orifice 36 and exits from the lower end 38 of the vortex tube. The warmer portion of the gas, on the other hand, leaves from the other end 40 of the vortex tube.

After the relatively warm gas passes from the upper end 40 of the vortex tube it is passed through a throttling valve 42 (FIG. 1) and on to a suitable pumping means such as an ejector or the like (not shown). The cold gas, on the other hand, is returned in a heat exchange relationship to the outside of the vortex tube 26 as illustrated by arrows 44 in FIG. 2. This cold gas, therefore, provides additional refrigeration to both the vortex tube in general and the incoming liquid hydrogen in particular. This heat exchange may be achieved, for example, by passing the cold gas through a jacket 46 surrounding the vortex tube 26 as is illustrated isometrically in FIG. 2 and schematically in FIG. 1.

The thin annular layer of slush hydrogen 32 that is formed within the vortex tube 26 is discharged into a suitable receiver 48 (FIG. 1) from which it may be withdrawn either from time to time or continuously, as desired, by means of a valved opening 50.

Although the vortex slush generator may have any orientation it is preferably maintained in a vertical position with the slush discharge volute in a downward direction so that gravity aids the flow of the fluid-solid slush phase towards the outlet valve 50.

While the invention has been particularly shown and described with reference to a preferred embodiment thereof, it will be understood by those skilled in the art that various changes in form and details may be made therein without departing from the spirit and scope of the invention. For example, it is well-known to one skilled in the art of handling cryogenic fluids that it is necessary for all components and areas of the system to be suitably insulated so as to prevent heat influx into the fluids. For clarity in the drawings, however, insulation means have not been shown, but it will be understood that insulation can and should be used where required to exclude ambient heat.

Similarly, it will be appreciated that although the invention has been specifically described, in terms of parahydrogen, its principles have applicability to other fields as well. For example, the cooling step using the helically coiled tube can be used for two-phase cooling in general and is not limited to the cooling of a particular element such as hydrogen.

The embodiments of the invention in which an exclusive property or privilege is claimed are defined as follows:

1. A cooling apparatus for cooling one-phase of a two-phase fluid comprising means for injecting first and second phases of a two-phase fluid into one end of a helical coil to provide a physical interface of the phases, means for maintaining said first and second phases of said fluid substantially separated and moving at different velocities through said coil to provide for cooling of said second phase by said first phase, and means at the other end of said coil for directing flow of said cooled second phase.

2. The apparatus of claim 1 wherein said injecting means includes a means for injecting said first phase as a liquid and said second phase as a gas.

3. A cooling apparatus as defined in claim 1, wherein said means for maintaining said first and second phases separated and moving at different velocities through said coil includes means for delivering said first phase to said coil at very high momentum.

4. A method for cooling one phase of a two-phase fluid comprising the steps of injecting the gas phase fluid at very high momentum along with the liquid phase fluid into a substantially helical coil so that the phases are separated as they flow through the coil to permit the gas phase to cool the liquid phase and collecting the cooled liquid phase at the other end of the coil.

5. The method of claim 4 wherein the injection step comprises the injection of two-phase hydrogen.

6. A cooling apparatus for cooling one phase of a two-phase fluid comprising:
a substantially helical coil;
means for injecting the two-phase fluid into one end of said coil so that at least one of said phases has a high momentum, whereby the more dense of the two phases is cooled as it passes through the coil;
means at the other end of said coil for separating said two phases; and
a vortex generator and means for delivering the cold fluid from said separator to the inlet portion of said vortex generator so that said cold phase is further cooled in said vortex generator.

7. The apparatus of claim 6 wherein said vortex generator is further comprised of: a vortex tube having an inner wall and an outer wall;
said vortex tube having an inlet volute at one end for introducing the cold phase of said fluid from said separator into said vortex tube in a substantially tangential direction with respect to said inner wall so that said cold phase is further cooled as it spirals along said inner wall, and so that part of said cold phase becomes less dense and moves inwardly in said vortex tube, a cold portion of said less dense part passing out of one end of said vortex tube and a warm part of said less dense part passing out of the other end of said tube;
and an outlet volute opening located in the wall of said tube at the opposite end of said vortex tube from said inlet volute for removing the further cooled phase.

8. The apparatus of claim 7 including a means for passing the cold portion of the less dense fluid from the one end of said vortex tube past the outer surface of said vortex tube in a heat exchange relationship.

9. A method for cooling one phase of a two-phase fluid comprising the steps of:
injecting both phases of said fluid into one end of a substantially helical coil, so that at least one of said phases has a high momentum whereby the more dense of the two phases is cooled as it passes through the helical coil;
separating the two phases at the other end of said coil; and
delivering the cold separated fluid to an inlet volute located at one end of a vortex tube so that the cold phase is further cooled as it spirals along the inner wall of said tube.

10. The method of claim 9 further including the step of removing the further cooled fluid from an outlet volute located at the opposite end of said vortex tube.

11. The method of claim 10 wherein part of the cold phase of said fluid becomes less dense, as said cold phase becomes further cooled, and moves inwardly in said vortex tube, a cold portion of said less dense part passing out of one end of said vortex tube and a warm portion of the less dense part passing out of the other end of the vortex tube and including the step of:
passing the cold portion past the outer surface of said vortex tube in a heat exchange relationship.

References Cited

UNITED STATES PATENTS

| | | | |
|---|---|---|---|
| 2,117,506 | 5/1938 | Reinhardt | 62—500 |
| 2,280,087 | 4/1942 | Hollander et al. | 62—48 X |
| 2,683,360 | 7/1954 | Nolbom | 62—514 X |
| 3,277,660 | 10/1966 | Kemper et al. | 62—500 X |
| 3,302,418 | 2/1967 | Walter | 62—55 |

LLOYD L. KING, Primary Examiner

U.S. Cl. X.R.

62—52, 55